United States Patent [19]
Burstein et al.

[11] Patent Number: 6,115,683
[45] Date of Patent: Sep. 5, 2000

[54] AUTOMATIC ESSAY SCORING SYSTEM USING CONTENT-BASED TECHNIQUES

[75] Inventors: Jill C. Burstein, Howell, N.J.; Randy Mark Kaplan, West Chester, Pa.; Susanne Wolff, New York, N.Y.; Chi Lu, Princeton, N.J.

[73] Assignee: Educational Testing Service, Princeton, N.J.

[21] Appl. No.: 08/828,247

[22] Filed: Mar. 31, 1997

[51] Int. Cl.[7] ................... G06F 17/30; G06K 9/00
[52] U.S. Cl. ..................... 704/1; 704/9; 434/353
[58] Field of Search ............ 701/1, 9, 10; 707/530–533; 434/322, 350, 352, 118, 353

[56] References Cited

U.S. PATENT DOCUMENTS

| | | | |
|---|---|---|---|
| 4,864,502 | 9/1989 | Kucera et al. | 704/9 |
| 4,978,305 | 12/1990 | Kraft | 434/353 |
| 5,259,766 | 11/1993 | Sack et al. | 434/362 |
| 5,371,807 | 12/1994 | Register et al. | 704/9 |

OTHER PUBLICATIONS

Burstein, et al., "Using Lexical Semantic Techniques To Classify Free–Responses", pp. 20–29, Jun. 1996.

Burstein, et al., "Final Report For Autimatic Scoring Of Advanced Placement Biology Essays Submitted To Advanced Placement", Oct. 28, 1996.

Burstein, et al., "Evaluating A Prototype Essay Scoring Procedure Using Off–The–Shelf Software", Research Report, ETS, Princeton, NJ, Jul. 1995.

Kernighan and Ritchie, *The C Programming Language,* 2nd Ed., pp. 139, 143 and 144, Prentice Hall, Englewood Cliffs, NJ.

Page, "The Classroom Challenge and Write America!", Handout for NCARE 1996 Annual Meeting, Session I, Chapel Hill, NC, pp. 1–3, Feb. 13, 1996.

Page et al., "Construct Validity In The Computer Grading Of Essays", Handout for American Psychological Association, New York, NY, pp. 1–3, Aug, 13, 1995.

Page, "Grading Essays By Computer: Why The Controversy?", Handout for NCME, Invited Symposium, New York, NY, pp. 1–3, APr. 11, 1996.

Page, "Computer Grading of Student Prose, USing Modern Concepts and Software", Journal of Experimental Education, 62(2), 127–142, (1994).

Page and Peterson, "The Computer Moves Into Essay Grading" Phi Delta Kappan, pp. 561–565, Mar. 1995.

Tria Systems, Inc., "An Analysis of IntelliMetric™ Performance: Jul. 1996 GMAT Analytic Writing Topics", Oct. 31, 1996.

Page, "Computer Grading Of Essay Traits In Student Writing", Handout for NCME, Invited Symposium, New York, NY, pp. 1–8, Apr. 11, 1996.

Page, "Computer Grading Of Essay Traits In Student Writing",*DRAFT* Handout for NCME, Invited Symposium, New York, NY, pp. 1–8, Apr. 11, 1996.

*Primary Examiner*—Vivian Chang
*Assistant Examiner*—Patrick N. Edouard
*Attorney, Agent, or Firm*—Woodcock Washburn Kurtz Mackiewicz & Norris LLP

[57] ABSTRACT

A system for carrying out a content-based process for automatically scoring essays is disclosed. The system includes a computer; a data storage device; a parse tree file stored in the data storage device, the parse tree file being representative of an essay in a parse tree format; a morphology stripping program; a concept extraction program for creating, on the basis of a morphology-stripped parse tree file, a phrasal node file; and a rule matching scoring program for scoring the essay on the basis of the phrasal node file.

15 Claims, 10 Drawing Sheets

AUTOMATIC ESSAY SCORING SYSTEM USING CONTENT-BASED TECHNIQUES

FIELD OF THE INVENTION

The present invention relates generally to the field of automatic test grading, and more particularly to a content-based process and related system for automatically scoring essays.

BACKGROUND OF THE INVENTION

Automatic, or computer, scoring of student essay examinations has been studied extensively by Professor Ellis B. Page and others in connection with Project Essay Grade (PEG). See, e.g., Page, E.B. (1994), Computer Grading of Student Prose, Using Modern Concepts and Software, Journal of Experimental Education, 62(2), 127–142. Although the details of the PEG systems and methods have apparently not been published, the available information indicates that the PEG system scores essays on the basis of approximations, or "proxes", of intrinsic criteria such as diction, grammar, and punctuation. For example, diction may be measured by variance in word length, and fluency by the number of words. The measured proxes are put into a scoring equation and a regression operation is performed to maximize the correlation of the computer score with that of human judges. Thus, e.g., word count may be transformed into its fourth root because, although human judges want students to produce a respectable amount of writing, writing beyond the point deemed "enough" is regarded less favorably. Since the fourth root of essay length flattens rapidly as essay length increases, it provides a useful predictor of the scoring of a human judge.

Such automatic essay scoring techniques are known to have problems with coachability and defensibility. Coachability refers to the relative ease with which a student can be coached to "trick" the system into giving her a better score than she deserves. Defensibility refers to the tendency of the system to unfairly downgrade an essay that has the correct content but lacks the features sought by the scoring system. These problems relate to the system's failure adequately to consider the content of an essay. The "content" of an essay, as that term is used herein, refers to the relevant concepts contained in the essay. The relevant concepts are predefined in view of the domain of knowledge with which the essay is concerned, and are used to define prescribed rules for scoring the essay. The particular essay scoring rules are not a part of the present invention, and are known to those skilled in the art of standardized testing. Further background information on computerized essay scoring is provided in the papers submitted with the Information Disclosure Statement filed herewith.

SUMMARY OF THE INVENTION

Accordingly, a primary object of the present invention is to provide an automatic essay scoring system and process that provides a reliable measure of the author's knowledge of the subject matter of the essay (as opposed, e.g., to the author's facility with grammar and punctuation). A presently preferred embodiment of the invention provides a process for automatically scoring an essay that has been stored in a parse tree format, wherein the essay relates to a predefined domain of knowledge. The inventive process includes: a morphology stripping step comprising reading the essay in parse tree format and generating a morphology-stripped parse tree representing the essay; a concept extraction step comprising reading the morphology-stripped parse tree and searching for matching concepts in a predefined lexicon file, wherein the lexicon file includes a plurality of metonyms for selected words, the metonyms being predetermined in accordance with the particular domain of the essay being scored, and wherein each matching concept is used to define a phrasal node associated with the essay; and a scoring step comprising searching for any matches between the phrasal node(s) defined by the concept extraction step and predefined rules, and scoring the essay based on the number of matches found.

A system in accordance with the present invention comprises a computer, a data storage device, a parse tree file representing the essay in a parse tree format, a morphology stripping program for controlling the computer in stripping morphology from the parse tree and storing a morphology-stripped parse tree, a concept extraction program for controlling the computer in creating a phrasal nodes file containing words representing concepts extracted from the morphology-stripped parse tree, and a scoring program for controlling the computer in scoring the essay on the basis of the phrasal nodes file.

Other features of the present invention are disclosed below.

DETAILED DESCRIPTION OF PREFERRED EMBODIMENTS

Figure 1:
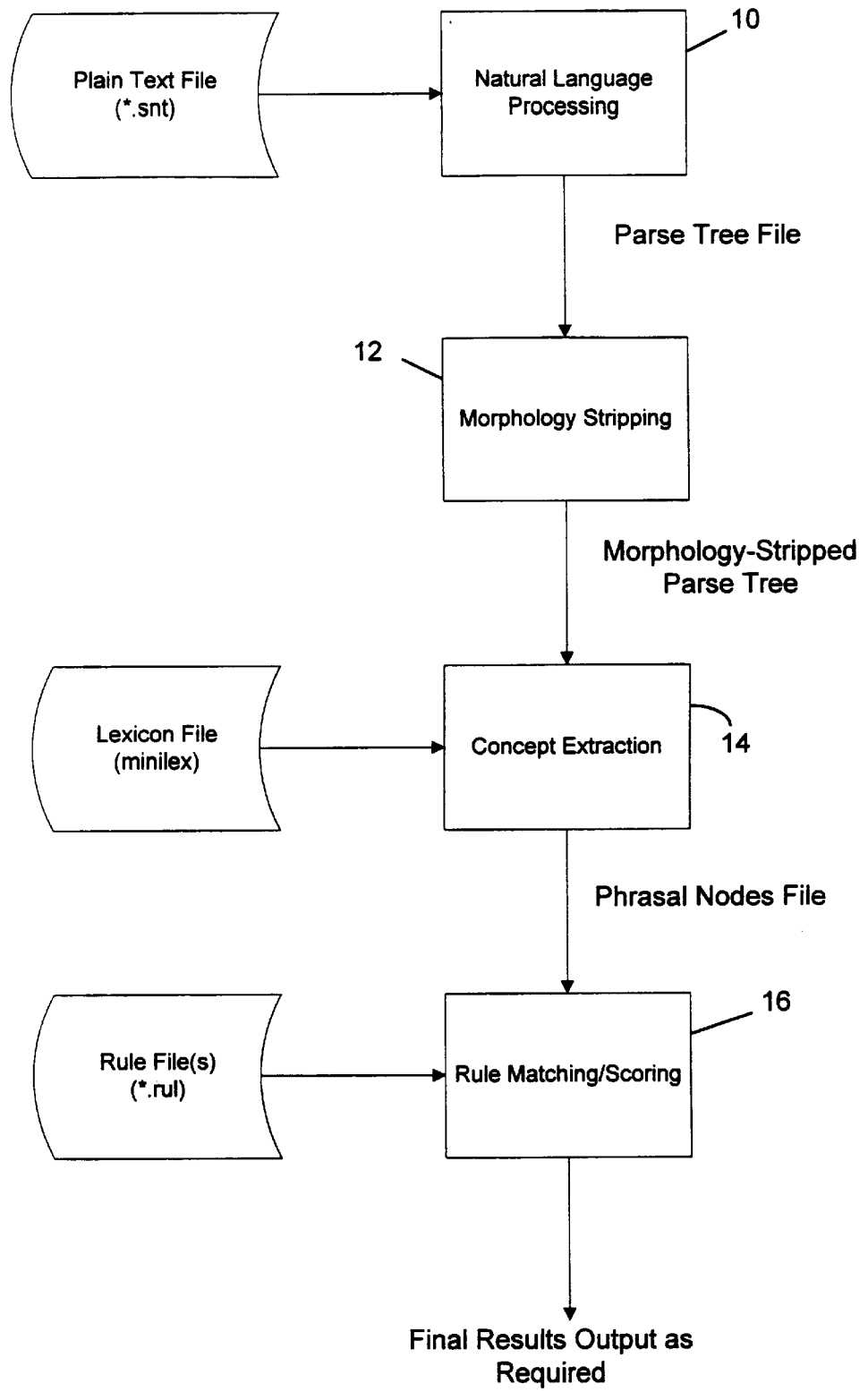
FIG. 1 schematically depicts the processing steps of the present invention.

Preferred embodiments of the present invention include four main elements, as shown in FIG. 1:

(1) a natural language processing program 10 (e.g., Microsoft Natural Language Processor) to convert a text file containing the essay to be scored into parse tree form;

(2) a morphology-stripping program 12 to strip morphology from the input parse tree;

(3) a program 14 to extract concepts from the morphology-stripped parse tree; and (4) a scoring program 16 that uses rule matching to score the essay using the extracted concepts.

When running the system, these four programs are executed in sequential order. In addition to these four programs, two kinds of auxiliary files are employed. One is a lexicon file, "minilex", which is created by hand, e.g., by linguists; and the other kind of file is a rule file, "*.rul", generated automatically (by a program called "rule.c") from the cleaned phrasal nodes. The expression cleaned phrasal nodes relates to the removal of extraneous, non-relevant concepts, i.e., "stuff" that does not contribute meaning with respect to assigning credit for the sentence. This is done before the automatic rule generation process is carried out, to avoid the generation of incorrect representations for rules that will lead to incorrect score assignments.

Before describing the computer programs/processing in greater detail, it should be noted that the present invention will be implemented preferably in software for use with any general purpose computer having a CPU, an input device (e.g., keyboard), a display device (CRT) or other means of displaying results, such as a printer, and a file storage device, and which is capable of performing the operations described below. The invention can be viewed as a general purpose computer that is operated in accordance with programs (such as the morphology stripping, concept extraction, and scoring programs) designed to carry out the invention. Since computers of the type necessary to perform the operations described below are known, no further detailed description of the computer and its associated peripheral devices is made herein. Similarly, since software languages capable of performing the operations described below are known, no further description of specific programming languages is necessary.

In addition, before describing the inventive computer programs and related processing in greater detail, a very brief introduction to certain well known (in the field) aspects of language processing will be provided.

Introduction

A grammar may be thought of as an algebraic system describing the processes by which instances of a language can be constructed. A grammar is made up of four elements: metavariables, called parts of speech when dealing with natural languages; an alphabet; a set of rules of production describing how a sequence of substitutions can be made for each metavariable; and a special metavariable S called the starting or root symbol, which is the starting point for the substitution process. These four elements are often represented by the symbols ($V_N$, $V_T$, P, S).

Parsing is the process by which phrases in a string of characters in a language are associated with the component names of the grammar that generated the string. A parse is often depicted as a tree, as in the following example of the parse of the English sentence, "The cat drank the milk".

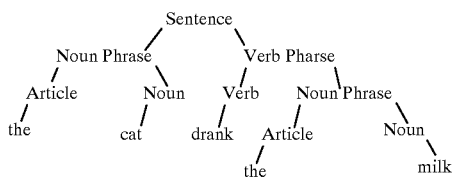

An equivalent parse of this sentence is $(_S(_{NP}(_A\text{the})_A(_N\text{cat})_N)_{NP}(_{VP}(_V\text{drank})_V(_{NP}(_A\text{the})_A(_N\text{milk})_N)_{NP})_{VP})_S$ which has the advantage of being linear, or one-dimensional, but may be harder to visualize. The term parse tree, as used herein, is intended to refer to any form of parse that is equivalent to a parse tree.

Morphology Stripping

Figure 2A:
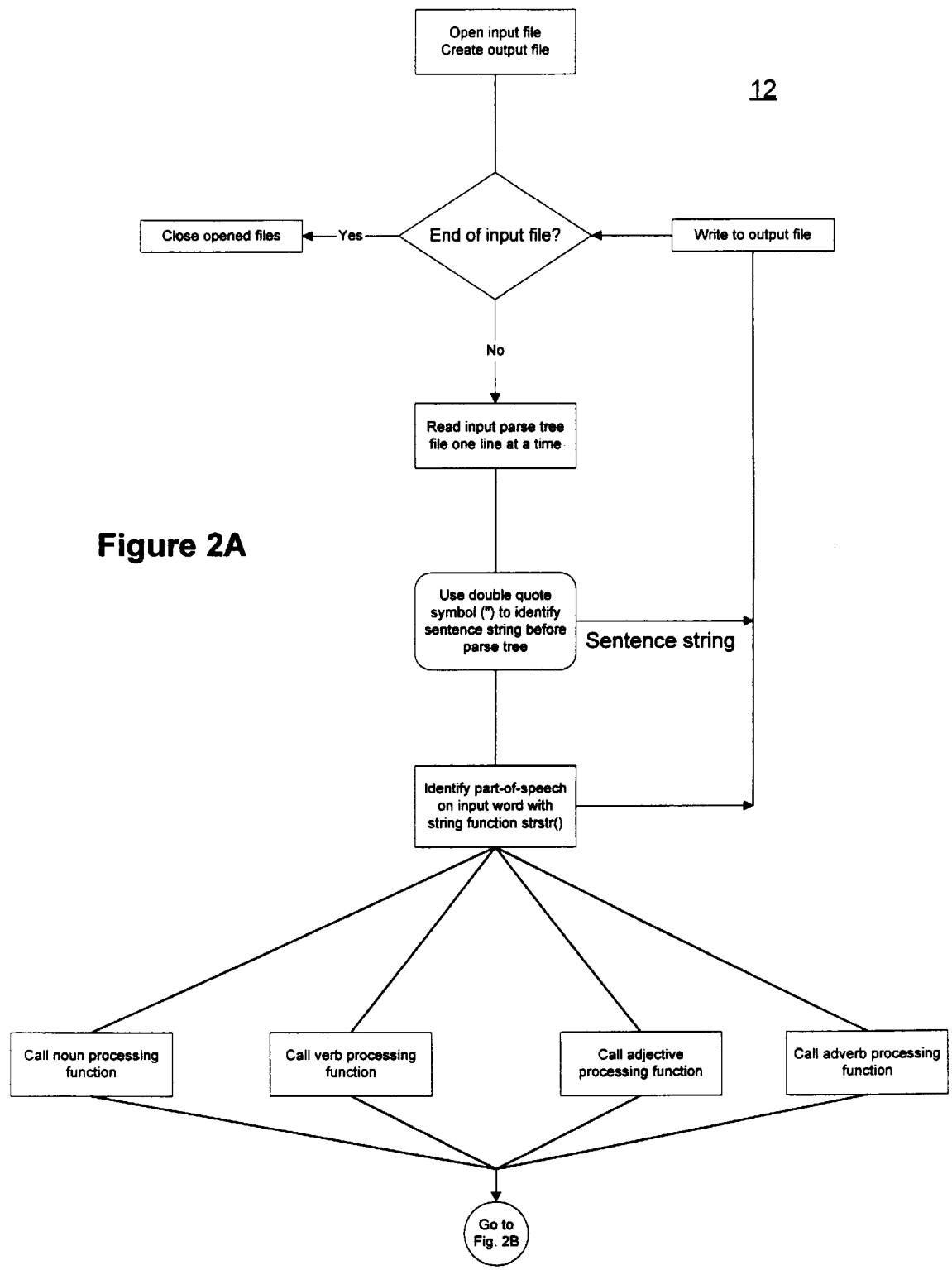
FIGS. 2A–2C, collectively, depict a flowchart of a morphology stripping process in accordance with the present invention.
Figure 2B:
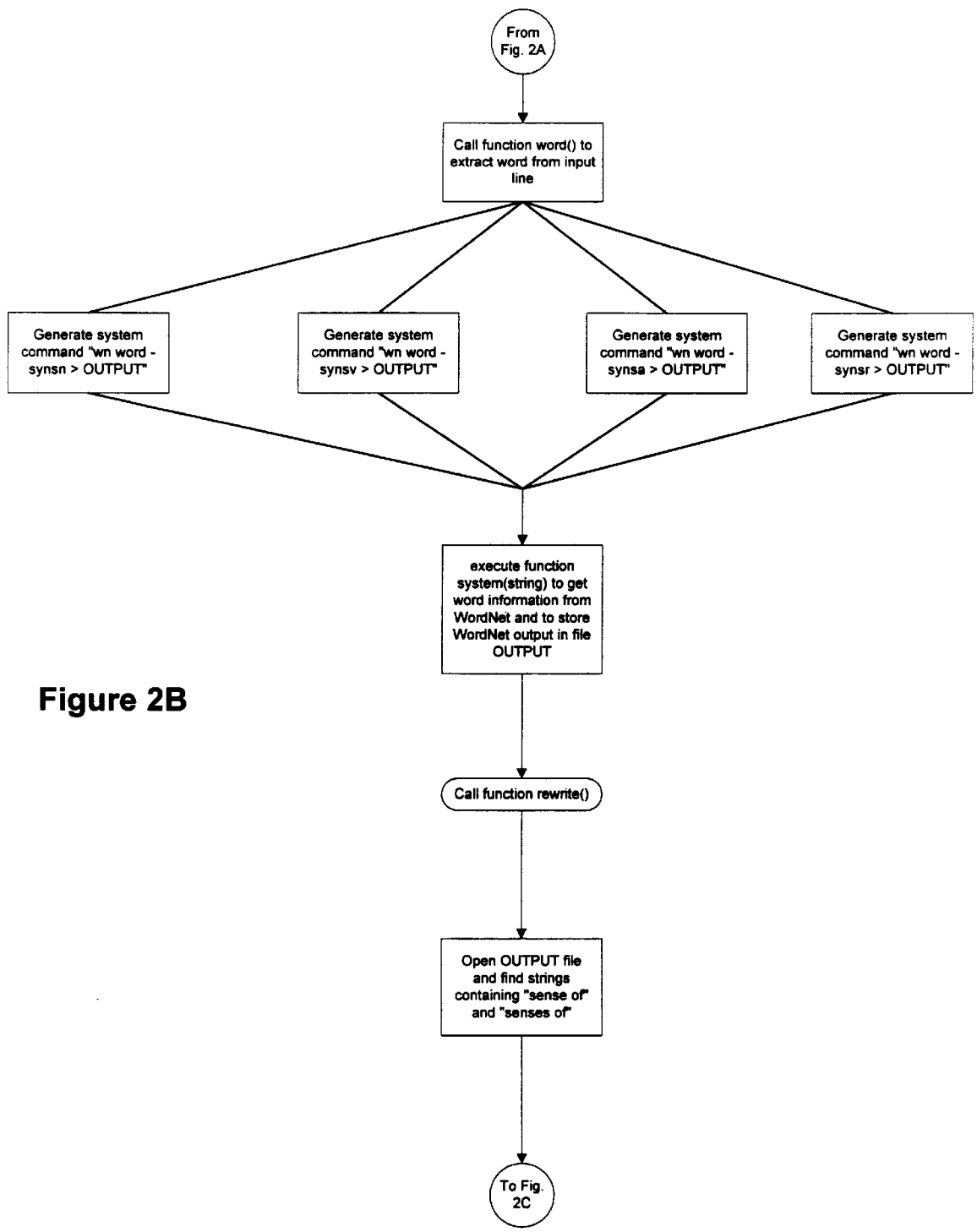
Figure 2C:
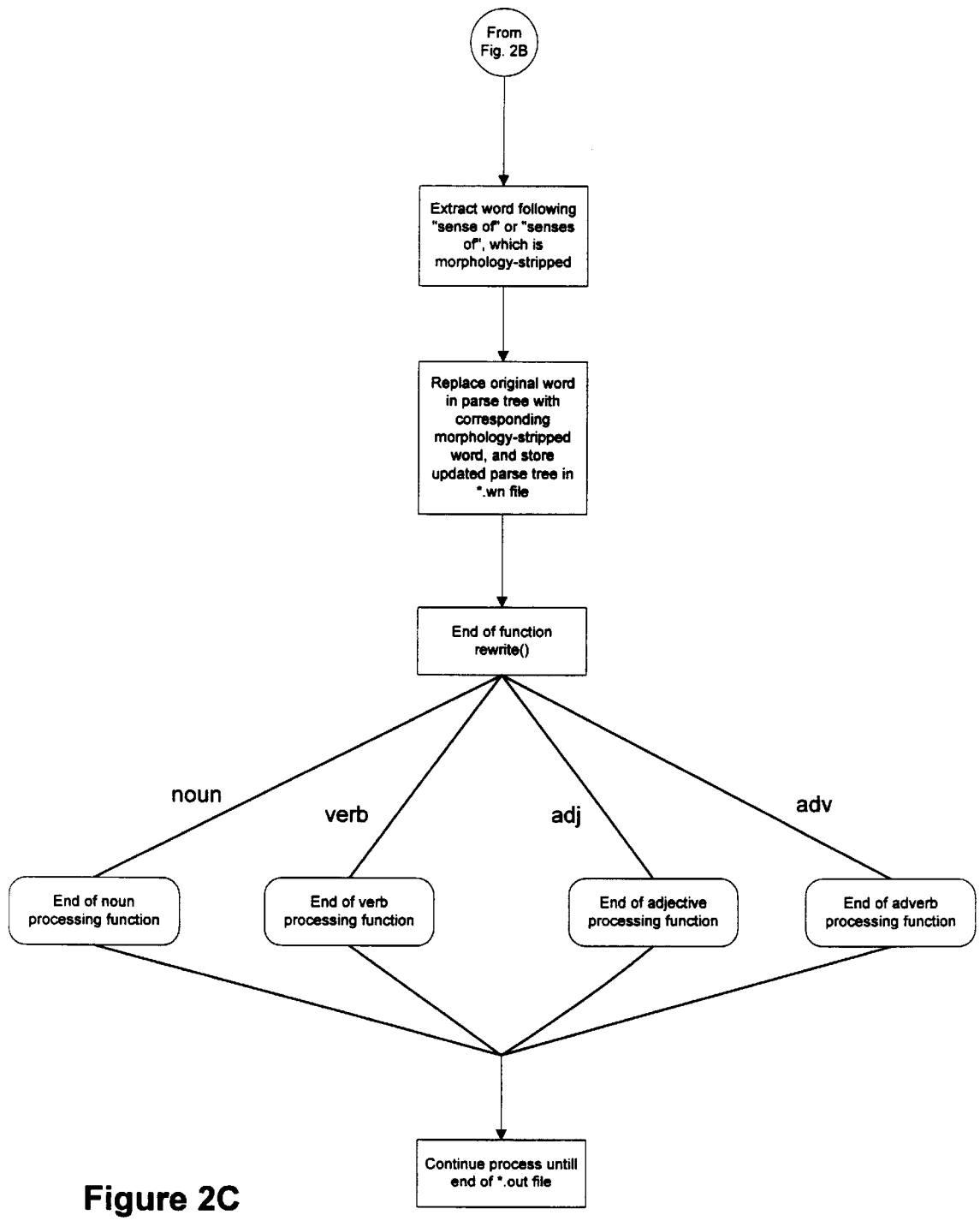

The morphology stripping process/program 12, called "strip.c", is depicted in flowchart form in FIGS. 2A through 2C. It opens and reads the input file(s) having the file extension ".out", and creates and writes to output file(s) with the extension "*.wn". The input file(s) (*.out) are in the format of a parse tree, and are produced from a plain text file by the natural language processing program 10. The following is an exemplary input parse tree for the sentences, "More intelligent individuals are joining the police. Police officers are older and more mature.":

```
[
DECL1  NP1        AJP1      AVP1       ADV1*    More
                             ADJ1*      intelligent
                   NOUN1*   individuals
       AUXP1      VERB1*    are
       VERB2*     joining
       NP2        DETP1     ADJ2*      the
       NOUN2*     police
       CHAR1       .
DECL1  NP1        NP2       NOUN1*     Police
                  NOUN2*    officers
       VERB1*     are
       AJP1       AJP2      ADJ1*      older
                  CONJ1*    and
                  AJP3      AVP1       ADV1*    more
                             ADJ2*      mature
       CHAR1
]
```

The above parse tree format may be explained as follows. (This explanation refers to the first of the above parse trees, but the principles involved apply to the second as well.) The top-level node (e.g., DECL) describes the sentence type. Each lower-level node (reading from left to right) indicates a further breakdown of the sentence into the syntactic constituents of which the sentence is comprised, e.g., subject noun phrase, main verb, direct object noun phrase. More particularly, we have:

```
DECL = Sentence type
NP1 = Subject Noun Phrase
   --> ADJP = Adjective Phrase
        --> ADVP1 = Adverb Phrase
             --> ADV1 = Adverb
        --> ADJ1 = Adjective
AUXP --> VERB 1 =  helping verb (auxiliary verb) to
                    the main verb in the sentence
VERB2 = main verb in the sentence
NP2 = Direct object Noun Phrase of the sentence
   --> DETP = Determiner Phrase
        --> ADJ = the
        --> NOUN = police
```

Using the above exemplary parse trees, the word "individuals" is replaced by "individual"; "are" is replaced by "be"; "joining" is replaced by "join"; "older" is replaced by "old", etc. Thus, the morphology stripping program 12 automatically strips the morphology from all words. In order to find the morphology-stripped words, the commercially available program WordNet may be used (although the invention is not limited thereto). This program reads in the parse tree one line at a time, and extracts the root word from it. An example of morphology information for the word "joining" is as follows:

```
[
Synonyms/Hypernyms (Ordered by Frequency) of verb joining
4 senses of join
Sense 1
join, fall in, get together
Sense 2
join, bring together, cause to be joined
    => connect, link, tie, connect together, put
together
```

-continued

```
Sense 3
join, make contact, come together, conjoin
      => connect, link, tie, connect together, put
together
Sense 4
connect, link, join, unite
]
```

At the second line of the above WordNet output, "4 senses of" is followed by the morphology-stripped word "join", which is used to replace the word "joining" in the parse tree. In general, the word following the string "sense of" or "senses of" in the WordNet output is extracted and then used to replace the original word in the parse tree. After the lookup, extraction, and replacement operations, the above example will be transformed (stripped of morphology) as follows:

```
[
DECL1  NP1                AJP1    AVP1       ADV1*   More
                                  ADJ1*      intelligent
                          NOUN1*  individual
       AUXP1              VERB1*  be
       VERB2*             join
       NP2                DETP1   ADJ2*      the
       NOUN2*             police
       CHAR1
DECL1  NP1                NP2     NOUN1*     Police
       NOUN2*                     officer
       VERB1*             be
       AJP1               AJP2    ADJ1*      old
                          CONJ1*  and
                          AJP3    AVP1       ADV1*   more
                                  ADJ2*      mature
       CHAR1
]
```

Thus, the output from the morphology stripping program 12 has the same format as the input, i.e., the output is a parse tree, except that morphological words have been stripped. The output is stored in a file with the extension ".wn".

The morphology stripping process/program 12 will now be summarized with reference to FIGS. 2A through 2C.

First, an input file "*.out" and an output file "*.wn" are opened. The program then checks to see whether the end of the input file has been reached. If so, all opened files are closed. If not, the program reads the contents of the parse tree input file one line at a time. The double-quote symbol (") is used to distinguish the sentence string from the parse tree. As shown, the sentence string is written into the output file, and then the next line is read from the input file. The parse tree is processed further as shown at the bottom of FIG. 2A. First, the program determines the part-of-speech by employing a string function "strstr()". As shown (see FIG. 2B), if the part-of-speech is a noun, verb, adjective or adverb, the word is processed further. Otherwise, it is written into the output file and the next line is read from the input file. As shown in FIG. 2B, nouns, verbs, adjectives, and adverbs are processed using corresponding functions; and then the function "word()" is called to extract the word in the input line. Next, a system command appropriate for the WordNet program is generated. The function "system (string)" is executed to obtain the word information from WordNet, and to store the output from WordNet into the output file. Next, as shown at the bottom of FIG. 2B, the function "rewrite()" is called. As shown at the top of FIG. 2C, the output file is then opened and the program searches for the string containing "sense of". Once the string "sense of" or "senses of" is found, the program extracts the word following this string. This is the morphology-stripped word. The morphology-stripped word is used to replace the original word in the parse tree, and is stored in the updated parse tree file *.wn. This concludes the function "rewrite" as well as the noun, verb, adjective and adverb processing functions. Finally, as shown at the bottom of FIG. 2C, the process is continued until the end of the input file (*.out) is reached.

Concept Extraction

The concepts-extraction program 14, named "readfile.c", uses a lexicon file, "minilex", and the parse tree file "*.wn" generated by the morphology stripping program 12. Generally, each file contains a multiple sentence parse tree, and each parsed sentence usually begins with "DECL", "FITTED", "IMPR", etc. (this is a result of the natural language processing program 10 used to create the parse tree). The following is an example file containing a three-sentence, morphology-stripped parse tree.

```
[
DECL1     VERB1*    improve
          NP1       NOUN1*      police
                    PRPRTCL1    VERB2*      train
                                NP2         AJP1 ADJ1* reduced
                                            AJP2 ADJ2* dangerous
                                            NOUN2 * confrontation
          CHAR1
FITTED1   VP1       NP1         NOUN1*      policeman
                                VERB1*      be
                                AJP1        ADJ1*       better
                    AJP2        ADJ2*       skill
                    PP1         PP2         PREP1*      at
                                            DETP1       ADJ3*     those
                                            NOUN2*      situation
          CHAR1
IMPR1     VERB1*    better
          NP1       NP2         NOUN1*      cadet
                    AJP1        ADJ1*       training
                    NOUN2*      program
          CHAR1
]
```

The concept extraction program 14 separates the sentences by those symbols in the first column. In each sentence, the symbols "NP", "VP", "PP", "AVP", "VERB", "INFCL", "SUBCL", and "COMPCL", located in the second column, are used as an indicator of a new phrasal node. When a line is read in from the input file, the program checks the first column to see if it is the beginning of a new sentence; it then checks the second column to see if a new phrasal node should be created, and then completes the processing of the current node. The program extracts the word inside the double quotation, and then searches for any matches in the lexicon file ("minilex"). If a match is found, the corresponding "concept" in the lexicon file is assigned to this word. The corresponding concept includes metonyms for the given word, where the metonyms are predetermined, e.g., by linguists, with consideration being given to the particular domain or subject matter of the essay being scored. The concept will be put inside a phrasal node bracket beginning with "XP: [". The total number of phrasal nodes depends upon the total number of symbols, listed above, in the second column of the parse tree. The phrasal nodes obtained from the above example file will appear as follows:

1 XP: [BETTER]
1 XP: [POLICE,TRAIN,DANGER,SITUATION]
2 XP: [POLICE,BETTER,TRAIN,SITUATION]
3 XP: [BETTER]
3:XP: [POLICE, TRAIN,]

These nodes are stored in files *.phr, *.1, *.2, and *.3. The total number of sentences is stored in a file called *.num.

Figure 3A:
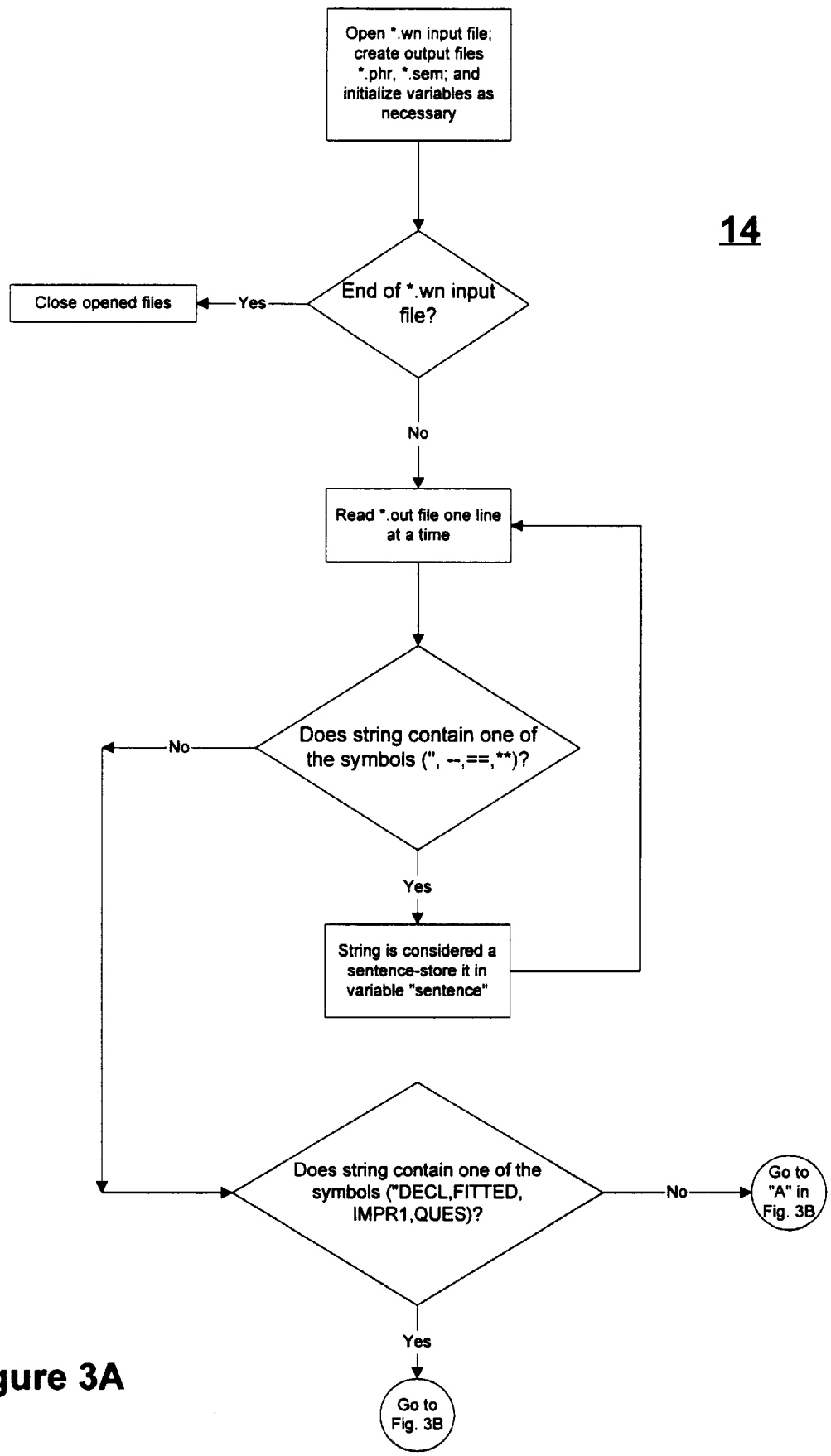
FIGS. 3A–3C collectively depict a flowchart of a concept extraction process in accordance with the present invention.
Figure 3B:
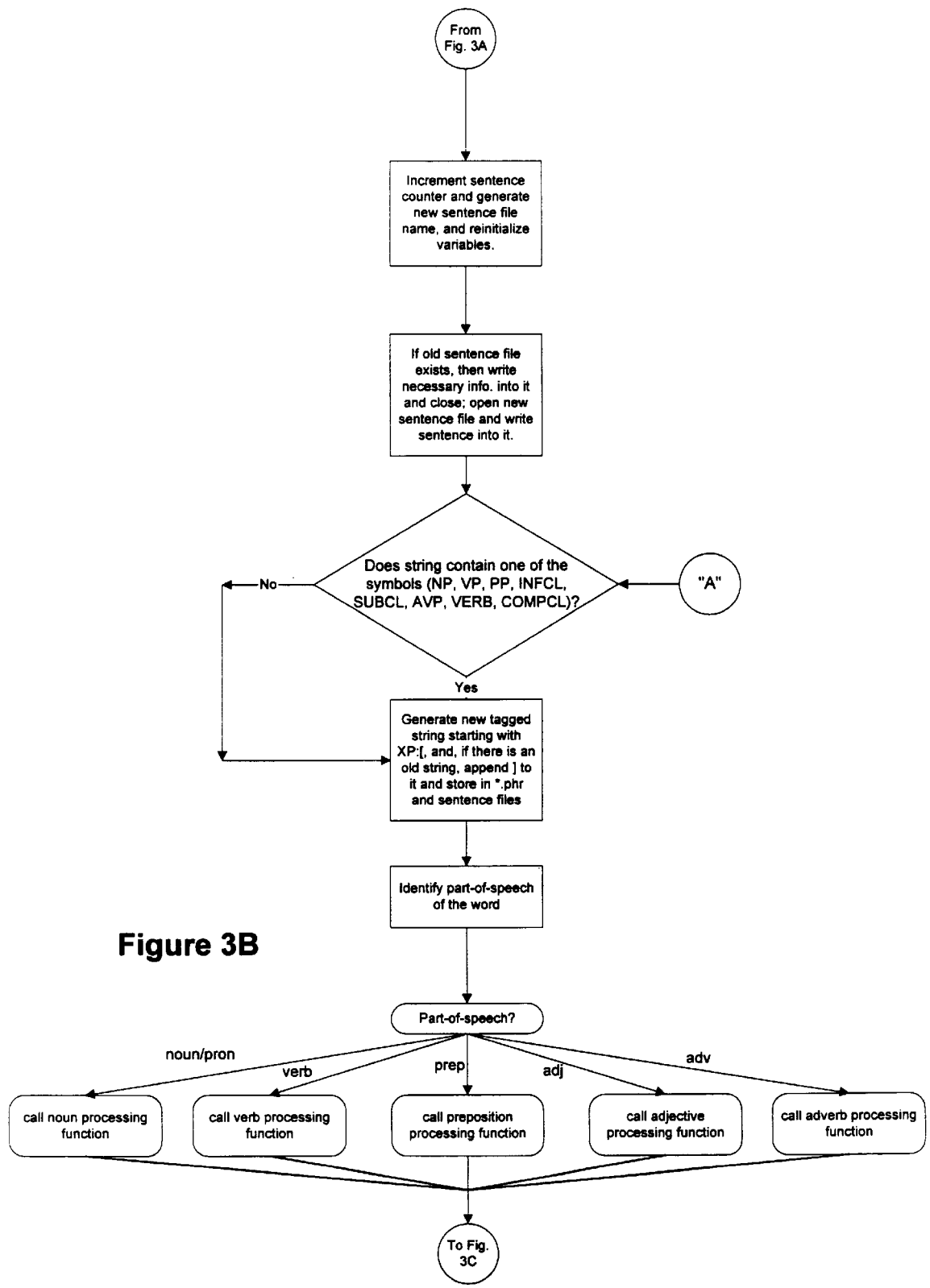
Figure 3C:
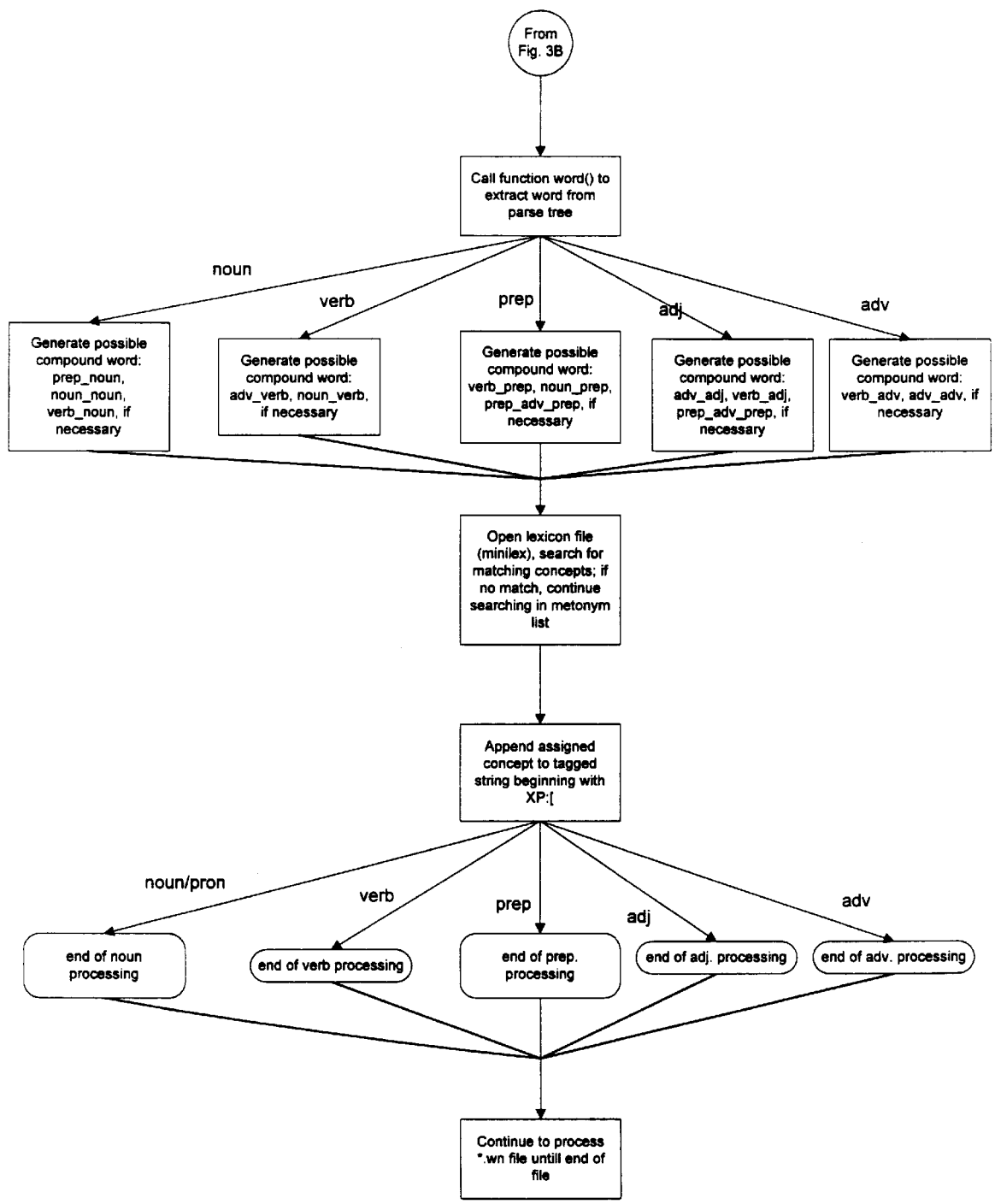

The concept extraction program/process 14 will now be summarized with reference to FIGS. 3A through 3C. First, the *.wn input file and *.phr and *.sem output files are opened. Certain variables used in the process are then initialized and then (see FIG. 3B) the program checks to determine whether the end of the input file *.wn has been reached. If so, all opened files are closed. If not, the program reads the contents of the *.out file one line at a time. For each line, the program determines whether the input string contains one of these symbols: ",--,==, or **. If one of these symbols is found, the program assumes that the string is a sentence, and stores it in the variable "sentence". If one of the prescribed symbols is not found, the program determines whether the string contains one of the symbols: DECL, FITTED, IMPR1, or QUES. If one of these symbols if found, a sentence counter variable "index" is incremented by 1 and a new sentence file name is generated with the input file name plus the index as the extension. If there is an old sentence file, then the necessary information is written into it and it is closed. The sentence is then written into the new sentence file. Next, referring to FIG. 3C, the program determines whether the string contains one of the following symbols in its second column: NP, VP, PP, INFCL, SUBCL, AVP, VERB, or COMPCL. If so, as shown in FIG. 3B, the program generates a new tagged string starting with the characters "XP: [". Once the close bracket symbol "]" is appended, it is placed into the *.phr file and the sentence file. The program then determines the part-of-speech of the word this line contains. Depending on whether the part-of-speech is a noun/pronoun, verb, preposition, adjective or adverb, the program will call an appropriate function to process this word, and then (as shown in FIG. 3C) call the function word to extract the word from the parse tree. As shown in FIG. 3C, possible compound words are generated, if necessary, and then the lexicon file "minilex" is opened and searched for the matching concept in the concepts entry list. If no match is found, the program continues searching for it in a metonym list. The minilex file is closed after the searching/matching process is performed. The found concept is assigned to the input word and appended to the tagged string beginning with "XP: [". As shown in FIG. 3C, at the end of the noun, pronoun, verb, preposition, adjective, and adverb processing functions, the program continues to process the *.wn input file until the end is reached.

Rule Matching

The rule files, *.rul, and phrasal nodes files *.1, *.2, *.3, etc., and *.num are the inputs to the rule matching process/program 16. The purpose of the rule matching program is to search for any matches between the sentence phrasal nodes and the generated rules, and to score the essay based on the number of matches. To start, the program generates the necessary input and output file names. The rule file names are defined in the head file "rulefile.h". The rule files are created by another program called "rule.c". Each rule file contains a set of rules automatically generated by "rule.c". The program "score.c" contains a set utility function that reads in the rules in the rule files and converts these rules into a tree and table structure. (Tree and table structures are well known in the computer programming art. They are used to organize large and complex data structures. Details of such structures may be found in "The C Programming Language," by B.W. Kernighan and D. M. Ritchie.) By performing such a transformation, the program enables the scoring process to be completed in an acceptable time period. After the rule files are processed, the program then opens the phrasal node files. It first constructs all possible combinations of the concepts taken from the nodes. For instance, assume a phrasal node file has two nodes as follows:

1 XP: [TRAIN,BETTER]
2 XP: [POLICE,SAFETY,FAST]

These two nodes will be augmented by the program as follows:

1 XP: [TRAIN]
1 XP: [BETTER]
1 XP: [TRAIN,BETTER]
2 XP: [POLICE]
2 XP: [SAFETY]
2 XP: [FAST]
2 XP: [POLICE,SAFETY]
2 XP: [POLICE,FAST]
2 XP: [SAFETY,FAST]
2 XP: [POLICE,SAFETY,FAST]

The next step is to find all matched rules for each of the augmented phrasal nodes in the tree structure of the rule files, and to assign the matched categories to the sentences. This search is done recursively because of the tree structure of the rule files. Taking the above set of phrasal nodes as an example, the program begins with the node with the index "1", and searches for any match against those three nodes in the top level of the tree. If a match is found, the program will compare the nodes having index "2" against any node in the next level of the tree. If no match is found for the phrasal nodes with the index "1", the program will discard these inputs and search for any match for the nodes having the index "2" at the first level of the rule tree. These steps are repeated until all the phrasal nodes have been searched or until the leaf node of the rule tree is reached. Once a match is found, the matched category will be assigned to this sentence. (Because there may be many correct answers to a question, the possible correct answers are arranged into general categories. Each category is characterized by several rules. If a sentence matches a rule for a given category, we speak of a "matched category.") The sentence phrasal nodes have to be checked with all the rule files. One sentence could be assigned multiple categories. To obtain a unique classification for a given sentence, the program uses a predefined keywords search strategy. The predefined keywords are determined from training data. Any matched rule that contains the predefined keywords are kept, and the rules that lack a matching keyword are discarded. If all the matched rules have no keyword, they will all be kept. If, after going through the keywords screening, there is still more than one classification, the program will pick up the match that has the longest set of concepts. After such two-step screening, the final result should be unique, although this is not always the case. The outputs are stored in two sets of files, i.e., "*.res" and "*.fin". The "*.fin" files contain the final results and "*.res" files contain the pre-screened information.

Figure 4A:
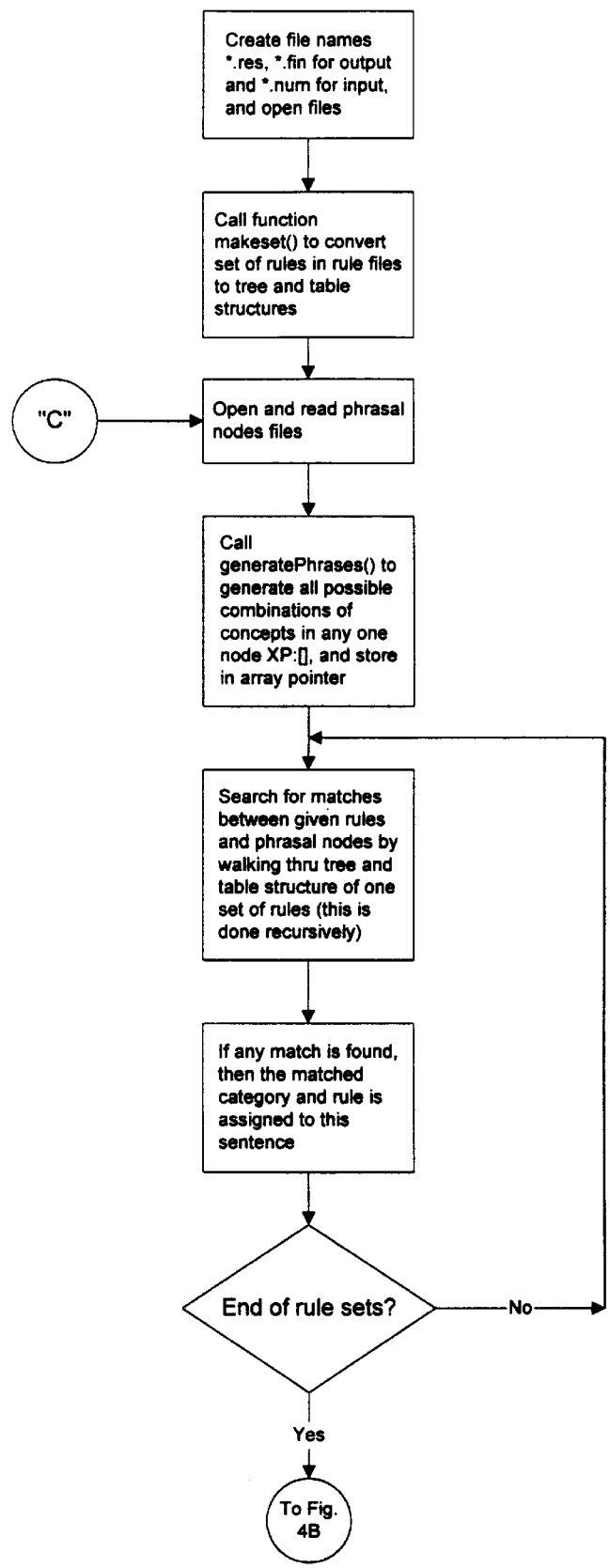
FIGS. 4A–4B collectively depict a flowchart of a scoring process in accordance with the present invention.
Figure 4B:
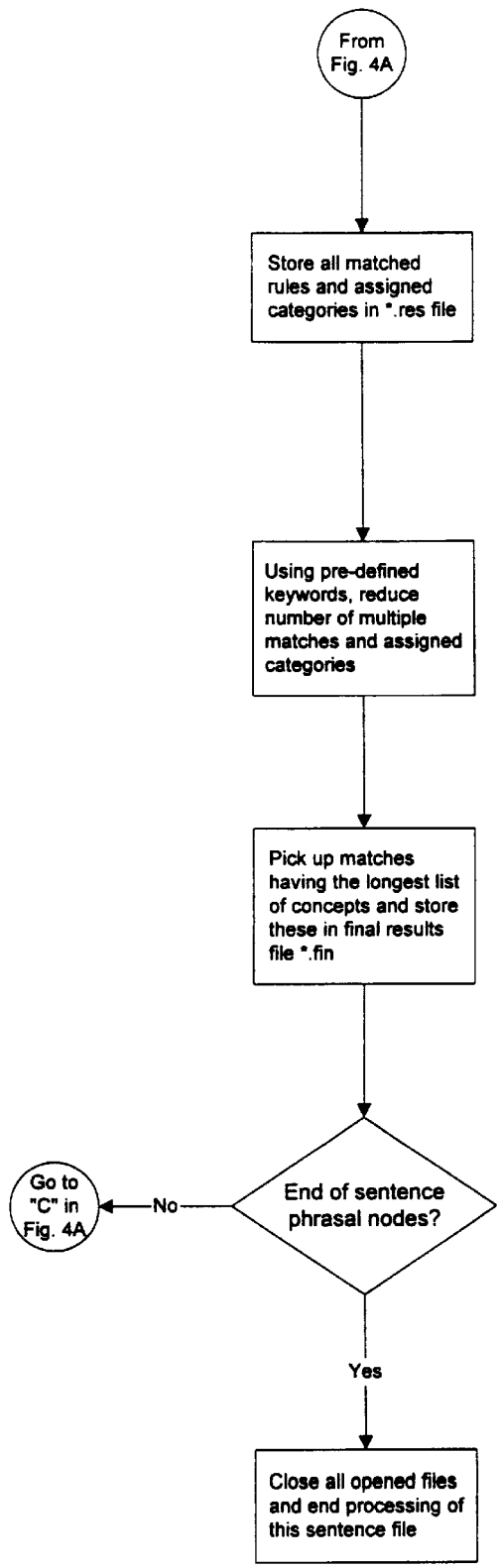

The scoring or rule matching process/program 16 will now be summarized with reference to FIGS. 4A and 4B. As shown in FIG. 4A, the program begins by opening input and output files, including *.res, *.fin (output files) and *.num (input file). The function makeset() is called to convert the set of rules and all rule files into tree and table structures using set utility functions. Next, as shown in FIG. 4B, all phrasal nodes are read from the phrasal nodes file. The function generatephrases() is then called to generate all possible combinations of concepts in any one node. Next, the program searches for any possible matches between the given rules and the phrasal nodes by walking through the tree and table structure of one set of rules. This is done recursively. If any match is found, the matched category and the matched rule will be assigned to this sentence. Once the end of all rule sets has been reached, the program stores all matched rules and assigned categories in the *.res file. As shown in FIG. 4B, the program then uses predefined keywords to narrow the number of matches and assigned categories. The matches having the longest list of concepts are retained and stored in the *.fin file. As shown, this process continues until all of the sentence phrasal nodes have been processed. Once the processing has been completed, all opened files are closed.

Figure 5:
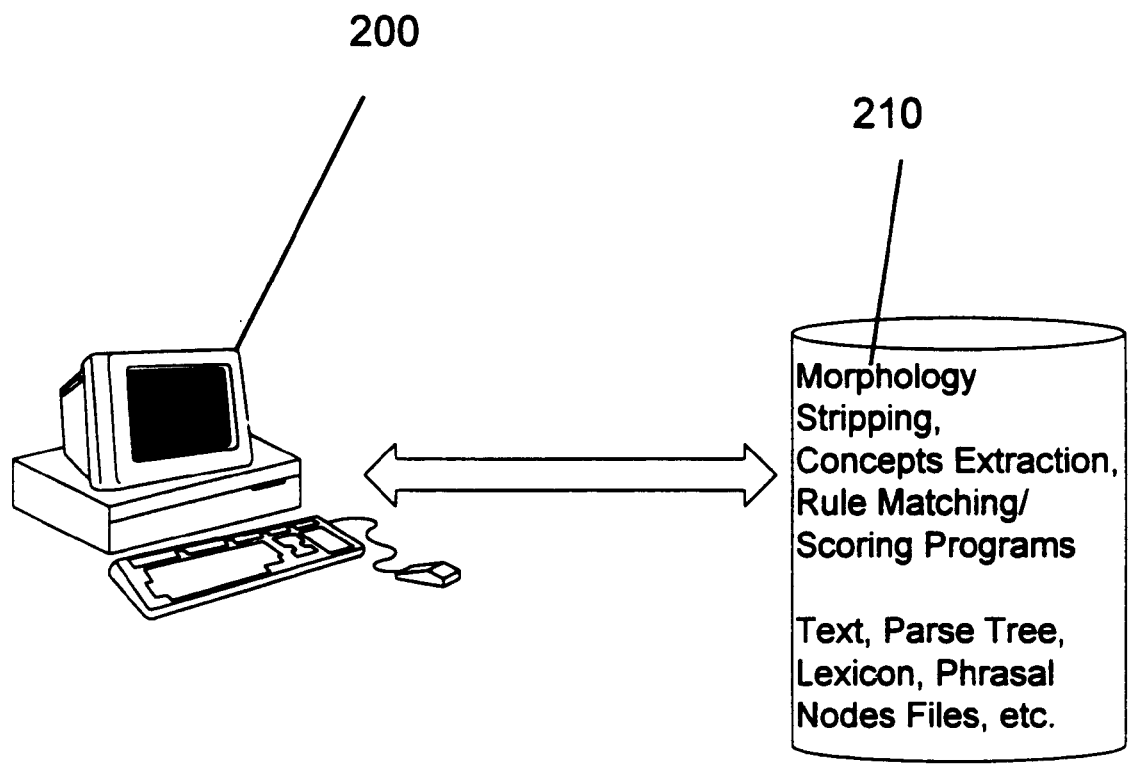
FIG. 5 is a block diagram of an automatic essay scoring system in accordance with the present invention.

As shown in FIG. 5, and as indicated in the foregoing description of preferred embodiments, the present invention can be carried out with a computer 200 and a storage device 210 containing files and programs as discussed above. These include the morphology stripping program, concept extraction program and scoring program. In addition, the invention employs text files, parse tree files, morphology-stripped files, lexicon files and phrasal nodes files.

Notwithstanding the foregoing detailed description of presently preferred embodiments, the present invention may be practiced in other forms without departing from the true spirit of the invention. For example, the morphology stripping, concept extraction, and rule matching processes may be modified in ways that will be apparent to those skilled in the art without substantially departing from the overall automatic scoring process. Accordingly, except as they may be expressly so limited, the scope of protection of the following claims is not intended to be limited to the specific examples disclosed above.

We claim:

1. A content-based process for automatically scoring an essay that has been stored in a parse tree format, wherein the essay relates to a predefined domain of knowledge, comprising:

(a) a morphology stripping step comprising reading the essay in parse tree format and generating a morphology-stripped parse tree representing the essay;

(b) a concept extraction step comprising reading the morphology-stripped parse tree and searching for matching concepts in a predefined lexicon file, wherein the lexicon file includes a plurality of metonyms for selected words, the metonyms being predetermined in accordance with the particular domain of the essay being scored, and wherein each matching concept is used to define a phrasal node associated with the essay; and (c) a scoring step comprising searching for any matches between the phrasal node(s) defined by the concept extraction step and predefined rules, and scoring the essay based on the number of matches found.

2. A process as recited in claim 1, wherein said morphology stripping step comprises the sub-steps of:

identifying an input file and an output file, wherein the input file contains a sentence string and a parse tree separated by a pre-defined symbol;

reading a line of the input file;

using said pre-defined symbol to distinguish the sentence string from the parse tree and, after reading the sentence string, reading a line of the parse tree from the input file;

processing each word of the line of the parse tree by: (1) determining the part-of-speech of the word and, if the part-of-speech is a noun, verb, adjective or adverb, processing the word further by performing the following sub-steps (2) and (3); (2) processing the word by using a pre-defined function to obtain a morphology-stripped version of the word; (3) using said morphology-stripped version of the word to replace the original word in the parse tree; and storing an updated parse tree in the output file.

3. A process as recited in claim 1, wherein said concept extraction step comprises the sub-steps of:

opening an input file and an output file, wherein said input file contains a morphology-stripped parse tree generated by said morphology stripping step and said output file is for storage of phrasal nodes;

reading an string from said input file;

determining whether said input string contains one of a first pre-defined set of symbols and, if so, identifying the string as a sentence and storing it in a sentence variable; and if none of said first pre-defined set of symbols is found, determining whether the string contains one of a second pre-defined set of symbols and, if so, incrementing a sentence counter variable and then writing the sentence is into a sentence file;

determining whether the string contains one of a third set of pre-defined symbols in a pre-defined column and, if so, generating a new tagged string for storage into the phrasal nodes output file;

determining a part-of-speech of a word contained in the string and, depending on whether the part-of-speech is a noun or pronoun, verb, preposition, adjective or adverb, processing the word with a pre-defined function and then extracting the word from the parse tree;

searching a pre-defined lexicon file for a concept matching the extracted word in a concepts entry list and, if no match is found, continuing searching for a match in a metonym list;

appending any matching concept found in the concepts entry list or metonym list to said tagged string; and continuing the foregoing sub-steps until the end of the input file is reached.

4. A process as recited in claim 1, wherein said scoring step comprises the sub-steps of:

reading a pre-defined set of rules in an input file and formatting said rules into tree and table structures;

reading phrasal nodes from a phrasal nodes input file, and generating combinations of concepts in any one phrasal node;

searching for possible matches between the pre-defined rules and the phrasal nodes by using said tree and table structure for one set of rules;

storing matched rules and assigned categories in an output file;

using predefined keywords to narrow the number of matches and assigned categories, wherein matches having the longest list of concepts are retained and stored in an output file; and repeating the foregoing sub-steps until all of the sentence phrasal nodes have been processed.

5. A process as recited in claim 1, wherein said morphology stripping, concept extraction, and scoring steps are performed in sequential order.

6. A system for carrying out a content-based process for automatically scoring an essay, comprising:

(a) a computer;

(b) a data storage device operatively coupled to said computer;

(c) a parse tree file stored in said data storage device, said parse tree file being representative of said essay in a parse tree format;

(d) a morphology stripping program stored in said data storage device for controlling said computer in reading said parse tree file, stripping morphology from said parse tree and storing a morphology-stripped parse tree in a morphology-stripped parse tree file;

(e) a concept extraction program stored in said data storage device for controlling said computer in creating, on the basis of said morphology-stripped parse tree file, a phrasal node file containing words representing concepts extracted from the morphology-stripped parse tree; and (f) a scoring program stored in said data storage device for controlling said computer in scoring said essay on the basis of said phrasal node file.

7. A system as recited in claim 6, wherein said concept extraction program performs the functions of searching for matches between words in said essay and words in a previously created lexicon file; and, when a match is found, assigning the matched word in the lexicon file to the corresponding word in the essay by creating a phrasal node corresponding to the matched word in the lexicon file and storing said phrasal node in said phrasal node file.

8. A system as recited in claim 6, wherein said scoring program performs the functions of searching for any matches between the phrasal node(s) defined by the concept extraction program and predefined rules, and scoring the essay based on the number of matches found.

9. A system as recited in claim 6, wherein said morphology stripping, concept extraction, and scoring programs are executed in sequential order.

10. A system as recited in claim 6, wherein said concept extraction program performs the functions of searching for matches between words in said essay and words in a previously created lexicon file; and, when a match is found, assigning the matched word in the lexicon file to the corresponding word in the essay by creating a phrasal node corresponding to the matched word in the lexicon file and storing said phrasal node in said phrasal node file; and said scoring program performs the functions of searching for any matches between the phrasal node(s) defined by the concept extraction program and predefined rules, and scoring the essay based on the number of matches found.

11. A method of using a computer scoring system to automatically score essays provided by test takers in response to domain-specific test items, comprising the steps of:

accepting electronic data representative of an essay provided in response to a selected domain-specific test item, each domain-specific test item being stored in a storage medium of the computer system in association with predefined subject matter data indicative of the content of an appropriate essay response to the item;

processing the electronic data to identify the subject matter content of said essay relative to the domain of said selected test item;

comparing the identified subject matter content to the predefined subject matter data associated with said selected test item; and automatically providing an assessment of the essay based said comparison.

12. A process as recited in claim 11, further comprising:

opening an input file and an output file, wherein said input file contains a morphology-stripped parse tree and said output file is for storage of phrasal nodes;

reading an string from said input file;

determining whether said input string contains one of a first pre-defined set of symbols and, if so, identifying the string as a sentence and storing it in a sentence variable; and if none of said first pre-defined set of symbols is found, determining whether the string contains one of a second pre-defined set of symbols and, if so, incrementing a sentence counter variable and then writing the sentence into a sentence file;

determining whether the string contains one of a third set of pre-defined symbols in a pre-defined column and, if so, generating a new tagged string for storage into the phrasal nodes output file;

determining a part-of-speech of a word contained in the string and, depending on whether the part-of-speech is a noun or pronoun, verb, preposition, adjective or adverb, processing the word with a pre-defined function and then extracting the word from the parse tree;

searching a pre-defined lexicon file for a concept matching the extracted word in a concepts entry list and, if no match is found, continuing searching for a match in a metonym list;

appending any matching concept found in the concepts entry list or metonym list to said tagged string; and continuing the foregoing sub-steps until the end of the input file is reached.

13. A process as recited in claim 11, further comprising:

reading a pre-defined set of rules in an input file and formatting said rules into tree and table structures;

reading phrasal nodes from a phrasal nodes input file, and generating combinations of concepts in any one phrasal node;

searching for possible matches between the pre-defined rules and the phrasal nodes by using said tree and table structure for one set of rules;

storing matched rules and assigned categories in an output file;

using predefined keywords to narrow the number of matches and assigned categories, wherein matches having the longest list of concepts are retained and stored in an output file; and repeating the foregoing sub-steps until all of the sentence phrasal nodes have been processed.

14. A content-based process for automatically scoring an essay that has been stored in a parse tree format, wherein the essay relates to a predefined domain of knowledge, comprising the following acts:

(a) reading the essay in parse tree format and generating a morphology-stripped parse tree representing the essay;

(b) reading the morphology-stripped parse tree and searching for matching concepts in a predefined lexicon file, wherein the lexicon file includes a plurality of metonyms for selected words, the metonyms being predetermined in accordance with the particular domain of the essay being scored, and wherein each matching concept is used to define a phrasal node associated with the essay; and (c) searching for any matches between the phrasal node(s) defined by the concept extraction step and predefined rules, and scoring the essay based on the number of matches found.

15. A process as recited in claim 14, further comprising:

identifying an input file and an output file, wherein the input file contains a sentence string and a parse tree separated by a pre-defined symbol;

reading a line of the input file;

using said pre-defined symbol to distinguish the sentence string from the parse tree and, after reading the sentence string, reading a line of the parse tree from the input file;

processing each word of the line of the parse tree by:

(1) determining the part-of-speech of the word and, if the part-of-speech is a noun, verb, adjective or adverb, processing the word further by performing the following sub-steps (2) and (3);

(2) processing the word by using a pre-defined function to obtain a morphology-stripped version of the word;

(3) using said morphology-stripped version of the word to replace the original word in the parse tree; and storing an updated parse tree in the output file.

* * * * *